(12) United States Patent
Cho

(10) Patent No.: US 12,314,172 B2
(45) Date of Patent: *May 27, 2025

(54) MEMORY CONTROLLER, MEMORY SYSTEM AND OPERATING METHOD OF MEMORY DEVICE

(71) Applicant: SK hynix Inc., Gyeonggi-do (KR)

(72) Inventor: Hung Yung Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,749

(22) Filed: Sep. 18, 2023

(65) Prior Publication Data
US 2024/0004789 A1    Jan. 4, 2024

Related U.S. Application Data

(60) Continuation of application No. 17/387,814, filed on Jul. 28, 2021, now Pat. No. 11,797,437, which is a division of application No. 16/367,492, filed on Mar. 28, 2019, now Pat. No. 11,106,578.

(30) Foreign Application Priority Data

Sep. 5, 2018   (KR) ........................ 10-2018-0106192

(51) Int. Cl.
| | |
|---|---|
| *G06F 12/00* | (2006.01) |
| *G06F 3/06* | (2006.01) |
| *G06F 12/02* | (2006.01) |
| *G06F 16/00* | (2019.01) |

(52) U.S. Cl.
CPC ........ *G06F 12/0253* (2013.01); *G06F 3/0608* (2013.01); *G06F 3/0652* (2013.01); *G06F 3/0658* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2016/0139812 A1* | 5/2016 | Zhang | ................... | G06F 3/0616 711/103 |
| 2017/0285948 A1* | 10/2017 | Thomas | ................ | G06F 3/0616 |
| 2017/0344307 A1* | 11/2017 | Shahidi | ................. | G06F 3/0679 |

\* cited by examiner

*Primary Examiner* — Tuan A Pham
(74) *Attorney, Agent, or Firm* — IP & T GROUP LLP

(57) ABSTRACT

A memory controller includes a block ratio calculator configured to calculate a ratio of free blocks among memory blocks for storing data; a policy selector configured to select, based on the calculated ratio of free blocks, any one garbage collection policy of a first garbage collection policy of specifying priorities to be used to select a victim block depending on attributes of the data, and a second garbage collection policy of specifying the priorities to be used to select the victim block regardless of the attributes of the data; and a garbage collection performing component configured to perform a garbage collection operation on at least one memory block of the memory blocks according to the garbage collection policy selected by the policy selector.

18 Claims, 15 Drawing Sheets

FIG. 3

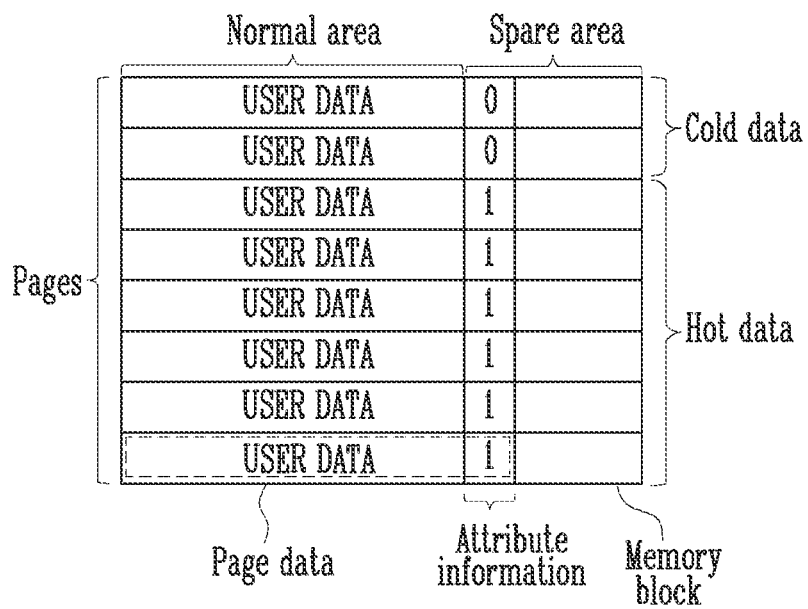

FIG. 4

< FIRST GARBAGE COLLECTION POLICY >

|  | DATA ATTRIBUTES | PRIORITY |
|---|---|---|
| VICTIM BLOCK SELECTION | AS THE AMOUNT OF COLD DATA INCREASES | HIGH PRIORITY |
|  | AS THE AMOUNT OF COLD DATA REDUCES | LOW PRIORITY |
| VICTIM DATA SELECTION | COLD DATA | HIGH PRIORITY |
|  | HOT DATA | LOW PRIORITY |

< SECOND GARBAGE COLLECTION POLICY >

|  | THE NUMBER OF VALID PAGES | PRIORITY |
|---|---|---|
| VICTIM BLOCK SELECTION | AS THE NUMBER OF VALID PAGES REDUCES | HIGH PRIORITY |
|  | AS THE NUMBER OF VALID PAGES INCREASES | LOW PRIORITY |

FIG. 5

Block 1 (Normal area | Attribute information):
| USER DATA 11 | 0 |
| USER DATA 12 | 0 |
| USER DATA 13 | 1 |
| USER DATA 14 | 1 |
| USER DATA 15 | 1 |
| USER DATA 16 | 1 |
| USER DATA 17 | 1 |
| USER DATA 18 | 1 |

Block 2 (Normal area | Attribute information):
| USER DATA 21 | 1 |
| USER DATA 22 | 1 |
| USER DATA 23 | 0 |
| USER DATA 24 | 0 |
| USER DATA 25 | 1 |
| USER DATA 26 | 1 |
| USER DATA 27 | 1 |
| USER DATA 28 | 1 |

Block 3 (Normal area | Attribute information):
| USER DATA 31 | 1 |
| USER DATA 32 | 1 |
| USER DATA 33 | 1 |
| USER DATA 34 | 1 |
| USER DATA 35 | 0 |
| USER DATA 36 | 0 |
| USER DATA 37 | 0 |
| USER DATA 38 | 0 |

Block 4: ERASED (all entries)

Block 5: ERASED (all entries)

Block 6: ERASED (all entries)

MEMORY CONTROLLER, MEMORY SYSTEM AND OPERATING METHOD OF MEMORY DEVICE

CROSS-REFERENCE TO RELATED APPLICATION

This application is a continuation of U.S. patent application Ser. No. 17/387,814 filed on Jul. 28, 2021, which is a division of U.S. patent application Ser. No. 16/367,492 filed on Mar. 28, 2019 and issued as U.S. Pat. No. 11,106,578 on Aug. 31, 2021, which claims benefits of Korean patent application number 10-2018-0106192, filed on Sep. 5, 2018. The disclosure of each of the foregoing application is incorporated herein by reference in its entirety.

BACKGROUND

1. Field of Invention

Various embodiments of the present disclosure generally relate to a memory controller and a memory system including the same, and more particularly, to a memory controller and a memory system including the same capable of efficiently performing a garbage collection operation.

2. Description of Related Art

Memory systems may include a memory controller and a memory device.

The memory device may store data or output the stored data, under control of the memory controller. For example, the memory device can be formed of volatile memory devices in which data stored therein is lost when power is turned off, or nonvolatile memory devices which can retain data stored therein even when power supply is interrupted.

SUMMARY

Various embodiments of the present disclosure are directed to a memory controller and a memory system including the same capable of efficiently performing a garbage collection operation.

An embodiment of the present disclosure may provide for a memory controller including a block ratio calculator configured to calculate a ratio of free blocks among a plurality of memory blocks for storing data; a policy selector configured to select, based on the calculated ratio of free blocks, any one garbage collection policy of a first garbage collection policy of specifying priorities to be used to select a victim block depending on attributes of the data, and a second garbage collection policy of specifying the priorities to be used to select the victim block regardless of the attributes of the data; and a garbage collection performing component configured to perform a garbage collection operation on at least one memory block of the plurality of memory blocks according to the garbage collection policy selected by the policy selector.

An embodiment of the present disclosure may provide for a memory system including a memory device including a plurality of memory blocks; and a memory controller configured to receive, from a host, program data and a program request including attribute information of the program data, configure page data by adding the attribute information of the program data to the program data, and control the memory device to program the page data to any one memory block of the plurality of memory blocks.

An embodiment of the present disclosure may provide for an operating method of a memory device including selecting, as a victim block, a first memory block storing a greatest number of pieces of cold data when a number of free blocks is equal to or greater than a first threshold, and a second memory block having a smallest number of valid pages when the number of free blocks is less than the first threshold; performing a garbage collection operation on the selected victim block; and increasing the first threshold when a selection ratio of the first memory block to the second memory block is greater than a second threshold and decreasing the first threshold when the selection ratio is less than the second threshold.

BRIEF DESCRIPTION OF THE DRAWINGS

FIG. 3 is a diagram illustrating an operation of programming page data to a memory block in accordance with an embodiment of the present disclosure.

FIG. 4 is a diagram for describing a garbage collection policy in accordance with an embodiment of the present disclosure.

FIG. 5 is a diagram for describing a process of selecting a garbage collection policy and a victim block in accordance with an embodiment of the present disclosure.

DETAILED DESCRIPTION

Figure 1:
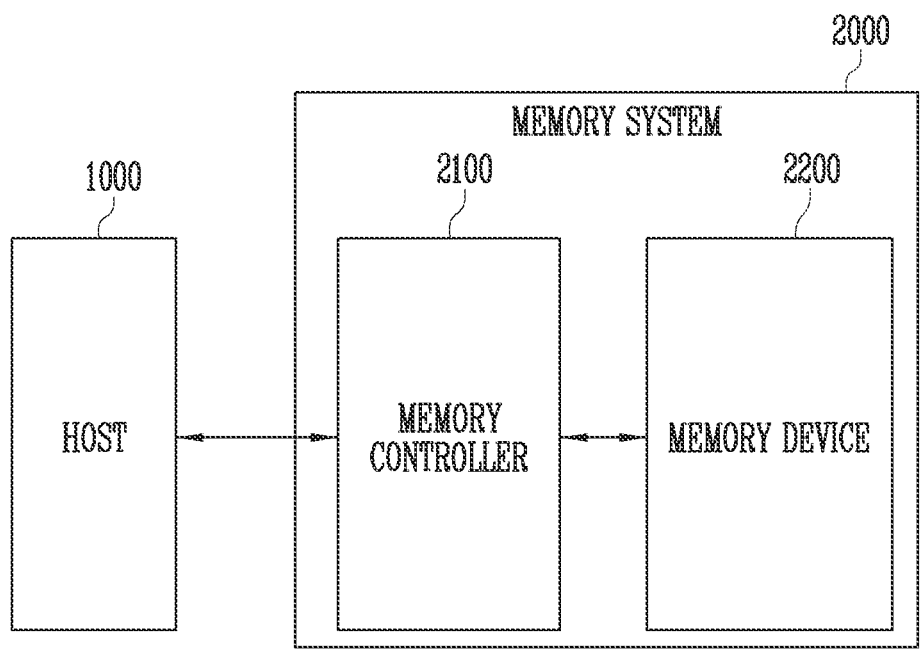
FIG. 1 is a diagram illustrating a memory system in accordance with an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram illustrating a memory system 2000 in accordance with an embodiment of the present disclosure.

Referring to FIG. 1, the memory system 2000 may include a memory device 2200 configured to store data, and a memory controller 2100 configured to control the memory device 2200 according to requests of a host 1000.

The host 1000 may communicate with the memory system 2000 using at least one of various interface protocols such as a non-volatile memory express (NVMe) protocol, a peripheral component interconnection-express (PCI-e or PCIe) protocol, an advanced technology attachment (ATA) protocol, a serial ATA (SATA) protocol, a parallel ATA (PATA) protocol, a universal serial bus (USB) protocol, a multimedia card (MMC) protocol, an enhanced small disk interface (ESDI) protocol, an integrated drive electronics (IDE) protocol, a mobile industry processor interface (MIPI) protocol, a universal flash storage (UFS) protocol, a small computer small interface (SCSI) protocol, and a serial attached SCSI (SAS) protocol. However, embodiments of the present disclosure are not limited to this.

The memory controller 2100 may control the overall operation of the memory system 2000 and data exchange between the host 1000 and the memory device 2200. For instance, during a program operation, the memory controller 2100 may transmit a command, an address, data, etc. to the memory device 2200. During a read operation, the memory controller 2100 may transmit a command, an address, etc. to the memory device 2200. The memory controller 2100 may perform a garbage collection operation on a plurality of memory blocks included in the memory device 2200.

The memory device 2200 may be formed of a volatile memory device 2200 in which data stored therein is lost when power is turned off, or a nonvolatile memory device which can retain data stored therein even when power supply is interrupted. The memory device 2200 may perform a program operation, a read operation, an erase operation, a garbage collection operation, etc. under control of the memory controller 2100. The memory device 2200 may include a plurality of memory blocks configured to store data. Each memory block may include a plurality of pages configured to store data. Each page may include a normal area in which user data may be stored, and a spare area in which meta data for the user data may be stored. The user data may be system data, media data, or text data which is generated by an operating system or various applications, but embodiments of the present disclosure are not limited thereto.

Figure 2:
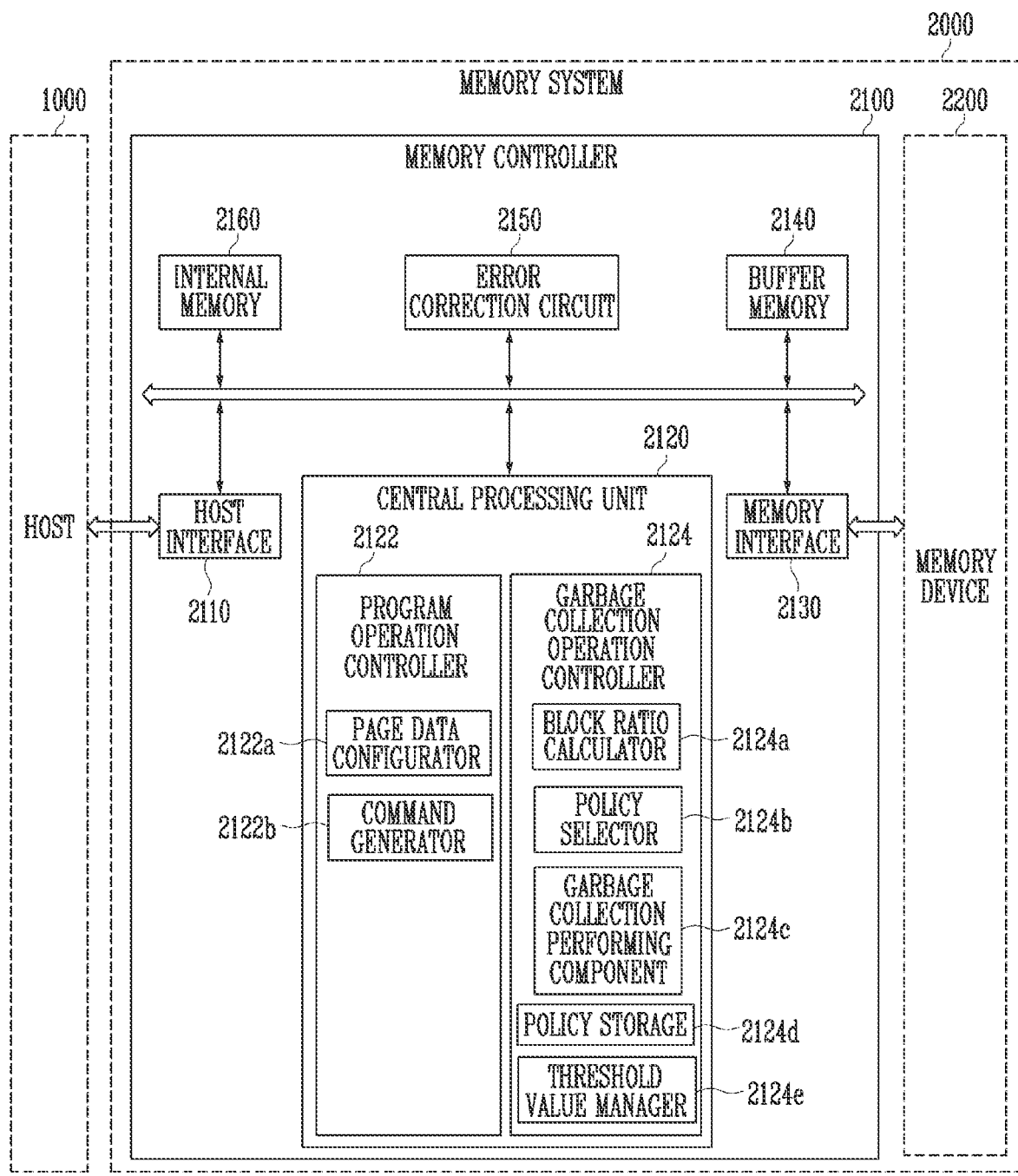
FIG. 2 is a diagram illustrating the memory controller shown in FIG. 1.

FIG. 2 is a diagram illustrating the memory controller 2100 shown in FIG. 1.

The memory controller 2100 in accordance with an embodiment of the present disclosure may receive program data and a program request from the host 1000. The program data may refer to data to be programmed to the memory device 2200. The program request may include attribute information of the program data. The attribute information of the program data may be information indicating whether the program data is hot data or cold data. It may be determined whether the program data is hot data or cold data depending on the type or size of the data. For example, data having a relatively large size may be classified as cold data, and data having a relatively small size may be classified as hot data. For instance, media data may be classified as cold data, and system data may be classified as hot data.

Generally, to program program data received from the host 1000 to the memory device 2200, a conventional memory controller is required to designate a plurality of memory blocks as open blocks and respectively store hot data and cold data in different open blocks.

However, when programming program data to the memory device 2200, the memory controller 2100 in accordance with an embodiment of the present disclosure may further program information about whether the program data is hot data or cold data. Therefore, the memory controller 2100 in accordance with an embodiment of the present disclosure may designate only one memory block as an open block so as to program the program data received from the host 1000 to the memory device 2200.

Referring to FIG. 2, the memory controller 2100 in accordance with an embodiment of the present disclosure may include a host interface 2110, a central processing unit 2120, a memory interface 2130, a buffer memory 2140, an error correction circuit 2150, and an internal memory 2160. The host interface 2110, the memory interface 2130, the buffer memory 2140, the error correction circuit 2150, and the internal memory 2160 may be controlled by the central processing unit 2120.

The host interface 2110 may perform data exchange with the host 1000 using various interface protocols. For example, the host interface 2110 may communicate with the host 1000 using at least one of various interface protocols such as a non-volatile memory express (NVMe) protocol, a peripheral component interconnection-express (PCI-E) protocol, an advanced technology attachment (ATA) protocol, a serial ATA (SATA) protocol, a parallel ATA (PATA) protocol, a universal serial bus (USB) protocol, a multimedia card (MMC) protocol, an enhanced small disk interface (ESDI) protocol, an integrated drive electronics (IDE) protocol, a mobile industry processor interface (MIPI) protocol, a universal flash storage (UFS) protocol, a small computer small interface (SCSI) protocol, and a serial attached SCSI (SAS) protocol. However, embodiments of the present disclosure are not limited to this.

The host interface 2110 may transmit program data received from the host 1000 to the buffer memory 2140, and transmit a program request received from the host 1000 to the central processing unit 2120.

The central processing unit 2120 may perform various operations or generate a command and an address so as to control the memory device 2200. For example, the central processing unit 2120 may generate various commands needed for a program operation, a read operation, an erase operation, a garbage collection operation.

The central processing unit 2120 may translate a logical address inputted from the host 1000 to a physical address so as to control the operation of the memory device 2200. The central processing unit 2120 may use an address mapping table stored in the internal memory 2160 to translate a logical address to a physical address or translate a physical address to a logical address. The central processing unit 2120 may update the address mapping table when new data is programmed to the memory device 2200 or data that has been stored in the memory device 2200 is erased.

The central processing unit 2120 may include a program operation controller 2122, and a garbage collection operation controller 2124.

The program operation controller 2122 may control a program operation for programming program data received from the host 1000 to the memory device 2200. The program operation controller 2122 may include a page data configurator 2122a and a command generator 2122b.

The page data configurator 2122a may receive a program request and configure page data in response to the program request. The page data may refer to data that is to be stored or has been stored in any one of a plurality of pages included in a memory block.

The page data configurator 2122a may configure the page data by extracting data attribute information included in the program request and adding the extracted data attribute information to the program data stored in the buffer memory 2140. In other words, the page data may include program data and attribute information corresponding to the program data. When the page data is configured, the page data configurator 2122a may notify the command generator 2122b that the page data has been configured.

The command generator 2122b may generate a program command to instruct the page data to be programmed and an address, and transmit the program command and the address to the memory device 2200. The command generator 2122b may control the buffer memory 2140 so that the page data that has been temporarily stored in the buffer memory 2140 may be transmitted to the memory device 2200. When notified from the page data configurator 2122a that the page data has been configured, the command generator 2122b may generate the program command and the address.

The garbage collection operation controller 2124 may control a garbage collection operation on a plurality of memory blocks included in the memory device 2200. The garbage collection operation controller 2124 may include a block ratio calculator 2124a, a policy selector 2124b, a garbage collection performing component 2124c, a policy storage 2124d, and a threshold value manager 2124e.

The block ratio calculator 2124a may calculate the ratio of free blocks among the memory blocks included in the memory device 2200. In other words, the block ratio calculator 2124a may calculate the ratio of the number of free blocks to which no data is written among the total number of memory blocks. Here, the total number of memory blocks may include the number of OP bocks allocated for over-provisioning (OP). An OP block may be an area allocated for performance management of the memory system.

In an embodiment, the ratio of free blocks may be calculated with reference to the address mapping table stored in the internal memory 2160. For example, the address mapping table may have information about the physical addresses of all of the memory blocks and information about the physical addresses of memory blocks storing data. Therefore, the block ratio calculator 2124a may calculate the total number of memory blocks with reference to the information about the physical addresses of all of the memory blocks, and may calculate the number of free blocks with reference to the information about the physical addresses of memory blocks storing data. The block ratio calculator 2124a may calculate the ratio of free blocks, based on the calculated total number of memory blocks and the calculated number of free blocks.

The policy selector 2124b may select a garbage collection policy for a garbage collection operation to be currently performed among a plurality of garbage collection policies. For example, the policy selector 2124b may select a garbage collection policy for a garbage collection operation to be currently performed, based on the ratio of free blocks calculated by the block ratio calculator 2124a.

The garbage collection policy may include any one of a first garbage collection policy for specifying priorities to be used to select a victim block, depending on the attributes of data, and a second garbage collection policy for specifying priorities to be used to select a victim block regardless of the attributes of data. However, embodiments of the present disclosure are not limited to this.

For example, the first garbage collection policy may specify that a memory block storing a greater number of pieces of cold data has a higher priority when a victim block is selected. Furthermore, the first garbage collection policy may further specify priorities to be used to select victim data in the selected victim block, depending on the attributes of corresponding data. For example, the first garbage collection policy may specify that the priority of cold data is higher than that of hot data when victim data is selected in the selected victim block.

For example, the second garbage collection policy may specify priorities to be used to select a victim block, depending on the number of valid pages included in each memory block. For instance, the second garbage collection policy may specify that a memory block having smaller number of valid pages has a higher priority when a victim block is selected.

For example, the policy selector 2124b may select the first garbage collection policy when the ratio of free blocks is a first threshold value or more, and may select the second garbage collection policy when the ratio of free blocks is less than the first threshold value. For example, on the assumption that the first threshold value is 0.15, when the ratio of free blocks is 0.2, the first garbage collection policy may be selected, and, when the ratio of free blocks is 0.1, the second garbage collection policy may be selected. The first threshold value may be adjusted depending on ratios of the first and second garbage collection policy selected when the garbage collection operation is performed. Detailed descriptions pertaining to this will be made in descriptions of related parts.

The garbage collection performing component 2124c may perform a garbage collection operation according to a selected garbage collection policy.

For example, in the case where the first garbage collection policy is selected, the garbage collection performing component 2124c may preferentially select, as a victim block, at least one memory block that includes the larger number of pieces of cold data among the memory blocks. The garbage collection performing component 2124c may preferentially perform the garbage collection operation on page data including cold data among page data stored in the selected victim block. In the case where the garbage collection operation on the page data including the cold data among the page data stored in the victim block has been completed or the number of pieces of page data including cold data is not enough to fill the entirety of one memory block, the garbage collection performing component 2124c may perform a garbage collection operation on page data including hot data.

For instance, in the case where the second garbage collection policy is selected, the garbage collection performing component 2124c may preferentially perform a garbage collection operation on a memory block having the least number of valid pages among the memory blocks The policy storage 2124d may store various garbage collection policies for garbage collection operations. For example, the policy storage 2124d may store the first garbage collection policy and the second garbage collection policy.

The threshold value manager 2124e may set or adjust the first threshold value. For example, the threshold value manager 2124e may adjust the first threshold value depending on selection ratios of the first garbage collection policy and the second garbage collection policy. For instance, the threshold value manager 2124e may receive, from the policy storage 2124d, information about which garbage collection policies were selected for previously-performed garbage collection operations, and manage the information as history information. The threshold value manager 2124e may analyze the history information and determine the selection ratios of the garbage collection policies selected during the previously-performed garbage collection operations. For example, the threshold value manager 2124e may analyze the history information and determine the number of times the first garbage collection policy has been selected per one selection of the second garbage collection policy.

The threshold value manager 2124e may increase the first threshold value as the ratio at which the first garbage collection policy has been selected is increased, per single selection of the second garbage collection policy, and may reduce the first threshold value as the ratio at which the first garbage collection policy has been selected is reduced, per single selection of the second garbage collection policy. For example, the threshold value manager 2124e may store a second threshold value as a reference value for adjusting the first threshold value. In the case where the ratio at which the first garbage collection policy has been selected exceeds the second threshold value, the threshold value manager 2124e may increase the first threshold value by a set value. In the case where the ratio at which the first garbage collection policy has been selected is less than the second threshold value, the threshold value manager 2124e may reduce the first threshold value by a set value. For instance, on the assumption that the first threshold value is 0.15 and the second threshold value is 0.1, if the ratio at which the first garbage collection policy has been selected is 0.11, the first threshold value is adjusted to 0.16, and if the ratio at which the first garbage collection policy has been selected is 0.09, the first threshold value is adjusted to 0.14. The reason for this is because of the fact that if the first garbage collection policy of specifying a cold data priority policy is excessively frequently selected, the garbage collection efficiency may be reduced in specific circumstances.

The memory interface 2130 may communicate with the memory device 2200 using various interface protocols.

The buffer memory 2140 may temporarily store data while the memory controller 2100 controls the memory device 2200. For example, data received from the host 1000 may be temporarily stored in the buffer memory 2140 until the program operation is completed. Furthermore, data read from the memory device 2200 during a read operation may be temporarily stored in the buffer memory 2140.

The error correction circuit 2150 may perform an error correction encoding during a program operation and an error correction decoding during a read operation.

The internal memory 2160 may be used as a storage for storing various information needed for the operation of the memory controller 2100. The internal memory 2160 may store a plurality of tables. For example, the internal memory 2160 may store an address mapping table in which logical addresses and physical addresses are mapped.

FIG. 3 is a diagram illustrating an operation of programming page data to a memory block in accordance with an embodiment of the present disclosure.

Referring to FIG. 3, the memory block may include a plurality of pages. Each page may include a normal area and a spare area.

As described above, page data may include user data and attribute information of the user data. A piece of page data may be programmed to one page.

In FIG. 3, there is illustrated the case where attribute information designated by '0' indicates that user data is cold data, and attribute information designated by '1' indicates that user data is hot data.

As described above, cold data and hot data may be stored in one open block. Hence, costs required for the memory controller to manage the open block may be reduced.

FIG. 4 is a diagram for describing the garbage collection policy in accordance with an embodiment of the present disclosure.

Although FIG. 4 illustrates two policies including the first garbage collection policy and the second garbage collection policy by way of example, various other garbage collection policies may be employed.

The first garbage collection policy may specify priorities to be used to select a victim block and victim data, depending on attributes of data. For example, the first garbage collection policy may specify that a memory block storing a greater number of pieces of cold data has a higher priority when a victim block is selected. Furthermore, the first garbage collection policy may specify that the priority of cold data is higher than that of hot data when victim data is selected in the selected victim block.

The second garbage collection policy may specify priorities to be used to select a victim block, depending on the number of valid pages. For instance, the second garbage collection policy may specify that a memory block having a smaller number of valid pages has a higher priority.

FIG. 5 is a diagram for describing a process of selecting a garbage collection policy and a victim block in accordance with an embodiment of the present disclosure.

FIG. 5 illustrates the case where the memory device includes six memory blocks. Furthermore, in FIG. 5, there is illustrated the case where user data is written to three memory blocks Block 1, Block 2, and Block 3, and no user data is written to three memory blocks Block 4, Block 5, and Block 6. In other words, three memory blocks Block 4, Block 5, and Block 6 are free blocks. At least one of memory blocks Block 4, Block 5, and Block 6 may be an OP block. Furthermore, FIG. 5 illustrates only normal areas and areas in which attribute information is stored among spare areas. In other words, FIG. 5 illustrates only page data among data stored in the memory blocks.

As described above, the memory controller may select a garbage collection policy based on the ratio of free blocks to all memory blocks. For example, the memory controller may select the first garbage collection policy when the ratio of free blocks is the first threshold value or more, and may select the second garbage collection policy when the ratio of free blocks is less than the first threshold value. When it is assumed that the first threshold value is set to 0.5, the ratio of free blocks is 0.5 in the embodiment shown in FIG. 5, so that the first garbage collection policy may be selected.

The memory controller may select a victim block according to the selected garbage collection policy. When the first garbage collection policy has been selected, the memory controller may select, as a victim block, at least one memory block storing a greater number of pieces of cold data among the memory blocks Block 1 to Block 3.

In the embodiment described with reference to FIG. 5, attribute information '0' indicates that user data is cold data, and attribute information '1' indicates that user data is hot data. Therefore, the embodiment shown in FIG. 5 indicates the case where two pieces of cold data are stored in each of memory block Block 1 and memory block Block 2, and four pieces of cold data are stored in memory block Block 3.

When only one memory block is selected as a victim block, the memory controller may select, as the victim block, the memory block Block 3 having the largest number of pieces of cold data.

Figure 6:
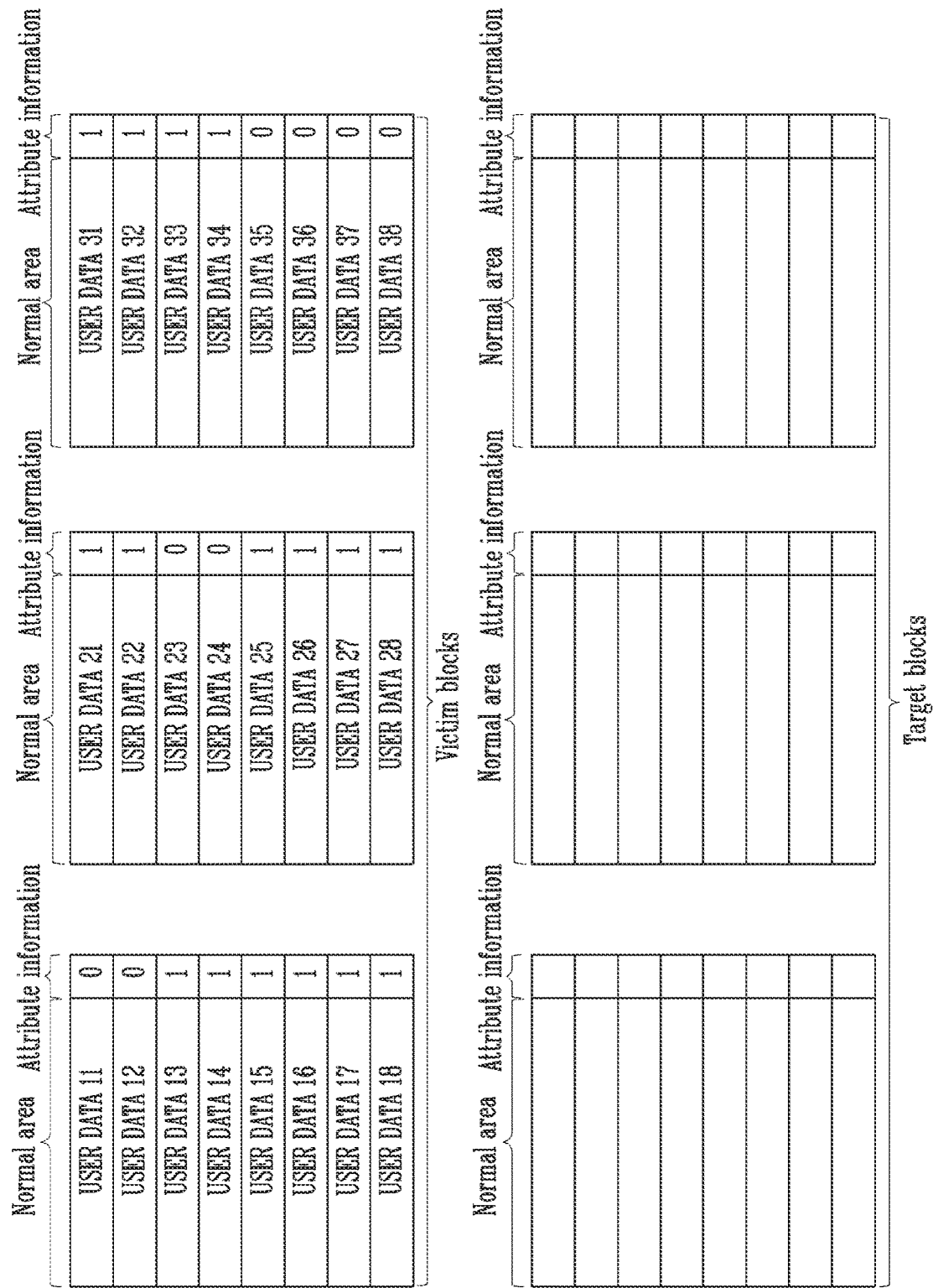
FIGS. 6 to 8 are diagrams for describing a process of performing a garbage collection operation according to a first garbage collection policy in accordance with an embodiment of the present disclosure.
Figure 7:
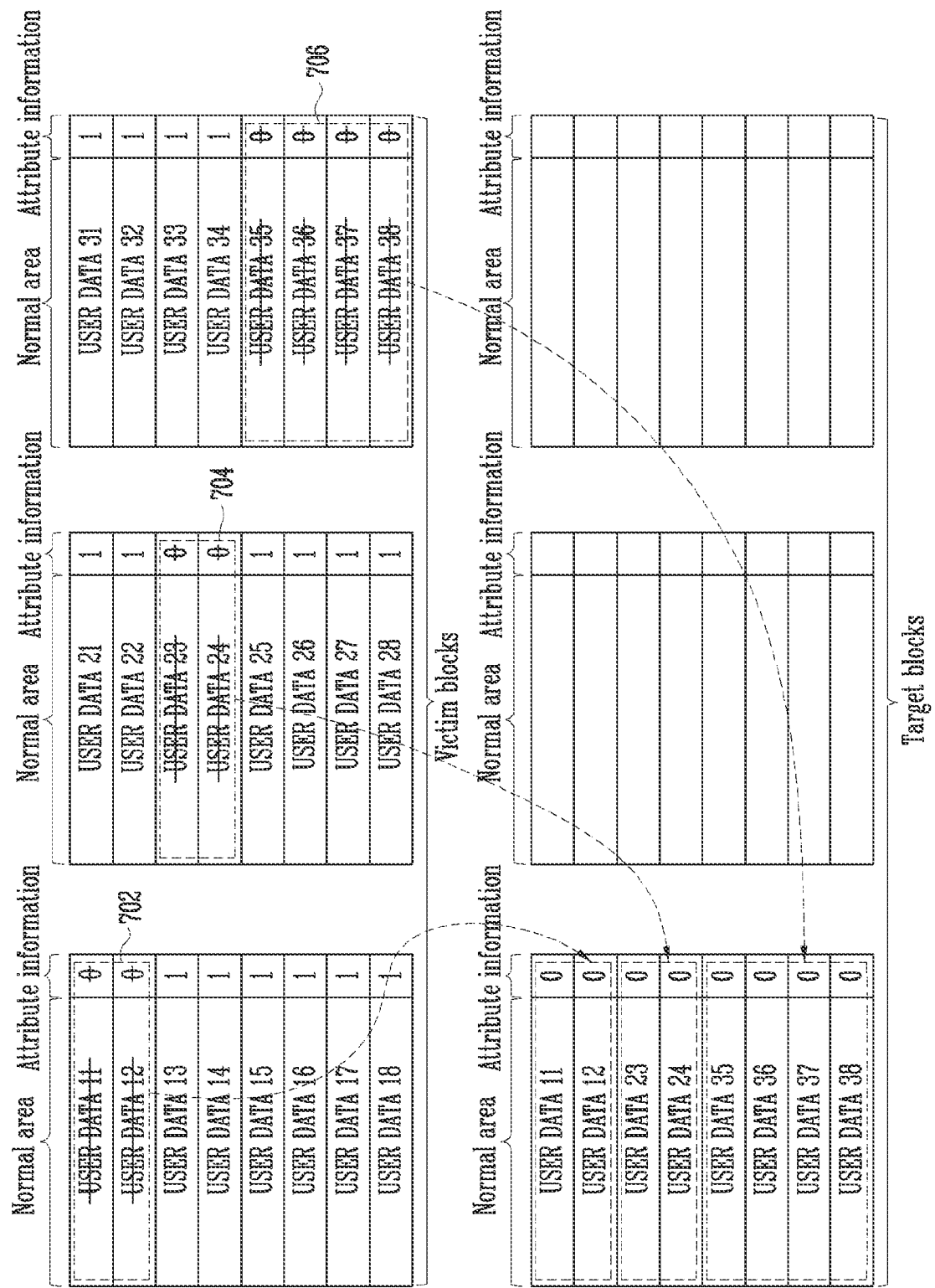
Figure 8:
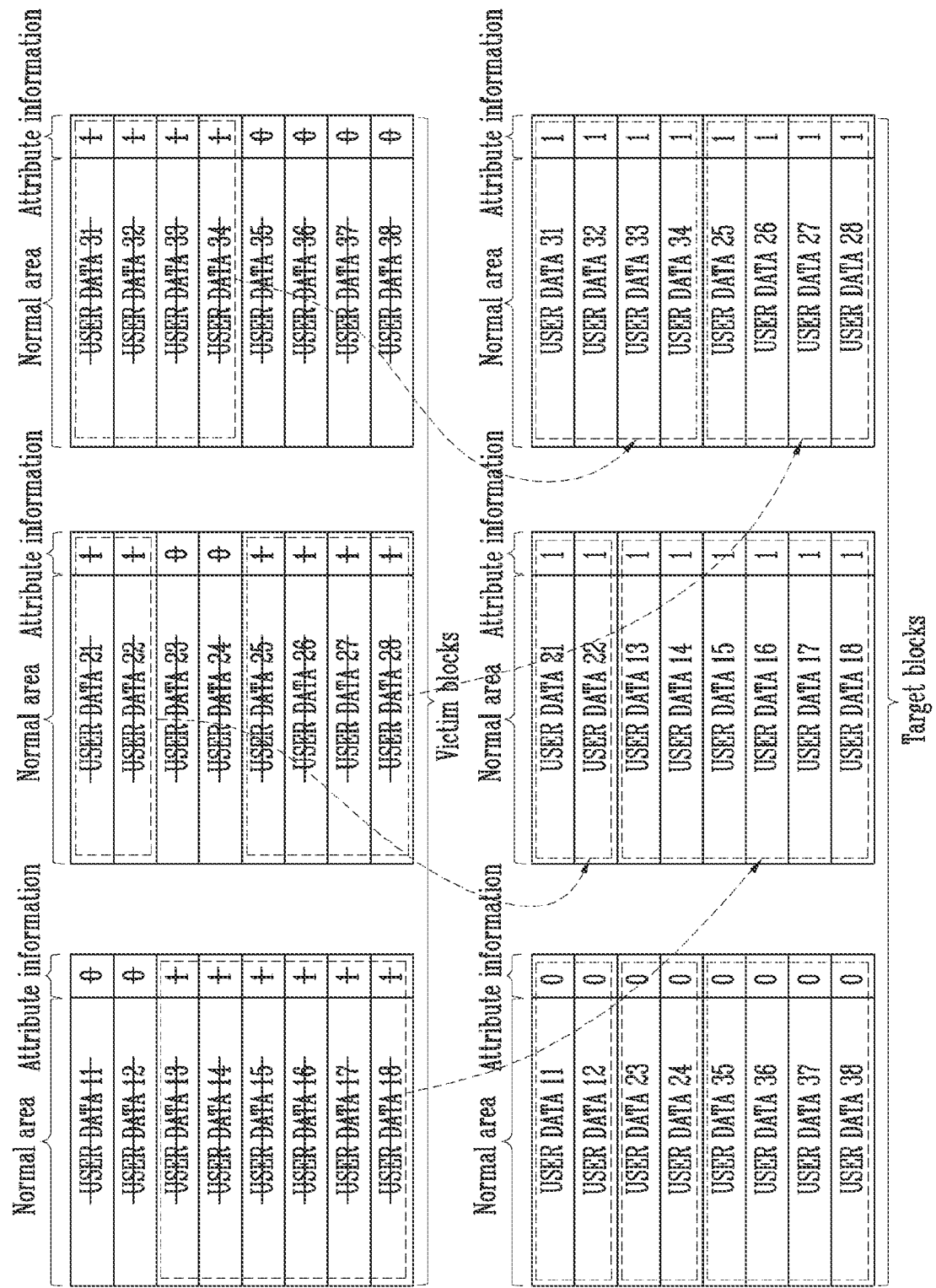

FIGS. 6 to 8 are diagrams for describing a process of performing the garbage collection operation according to the first garbage collection policy in accordance with an embodiment of the present disclosure. FIGS. 6 to 8 illustrate only normal areas and areas in which attribute information is stored among spare areas. In other words, FIGS. 6 to 8 illustrate only page data among data stored in the memory blocks. In the embodiment described with reference to FIGS. 6 to 8, attribute information '0' indicates that user data is cold data, and attribute information '1' indicates that user data is hot data. In FIG. 6, there is illustrated the case where three target blocks are selected to perform a garbage collection operation for page data programmed to three victim blocks.

In FIG. 7, there is illustrated the case where a garbage collection operation is preferentially performed on page data 702, 704, 706 including cold data among page data programmed to victim blocks according to the first garbage collection policy. In the case where the first garbage collection policy is selected, the memory controller may preferentially perform the garbage collection operation on page data including cold data with reference to attribute information included in each page data. In other words, the memory controller may preferentially perform the garbage collection operation on the page data 702, 704, and 706 including attribute information '0'. Referring to FIG. 7, it can be understood that the page data 702, 704, and 706 including attribute information '0' has been moved to one of the target blocks by preferentially performing the garbage collection operation on the corresponding page data 702, 704, and 706.

In the case where the garbage collection operation on the page data including the cold data has been completed or the number of pieces of page data including cold data is not enough to fill one memory block, a garbage collection operation may be performed on page data including hot data. Referring to FIG. 8, it can be understood that page data including attribute information '1' has been moved to the target blocks by performing the garbage collection operation on the corresponding page data.

Figure 9:
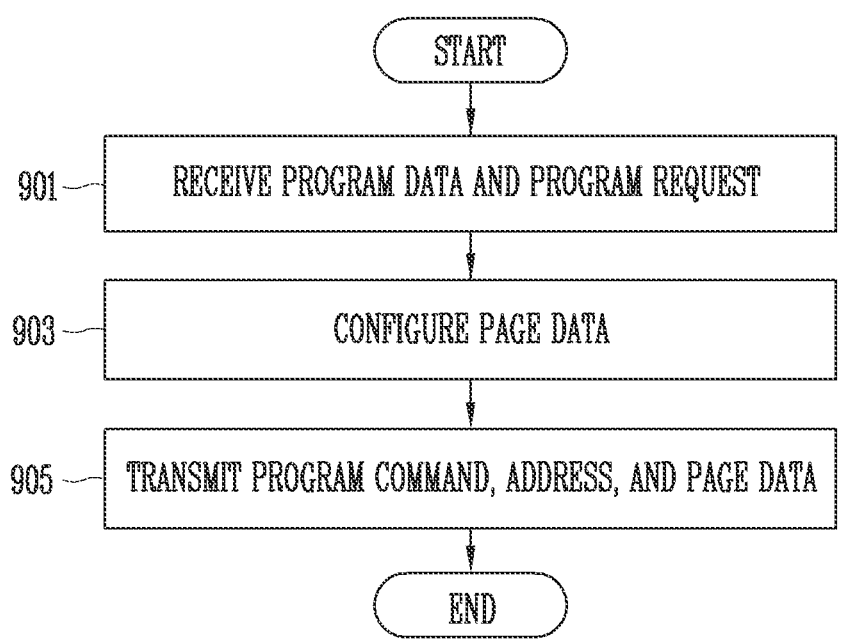
FIG. 9 is a flowchart for describing a method of operating the memory controller in accordance with an embodiment of the present disclosure.

FIG. 9 is a flowchart for describing a method of operating the memory controller in accordance with an embodiment of the present disclosure.

At step S901, the memory controller may receive program data and a program request from the host. The program request may include attribute information indicating attributes of the program data. The attribute information may be information about whether the program data is hot data or cold data.

At step 903, the memory controller may configure page data. For example, the memory controller may configure the page data by extracting attribute information included in the program request received from the host and adding the extracted attribute information to the program data.

At step 905, the memory controller may generate a program command and an address to program the page data to the memory device. The memory controller may transmit the program command, the address, and the page data to the memory device.

Figure 10:
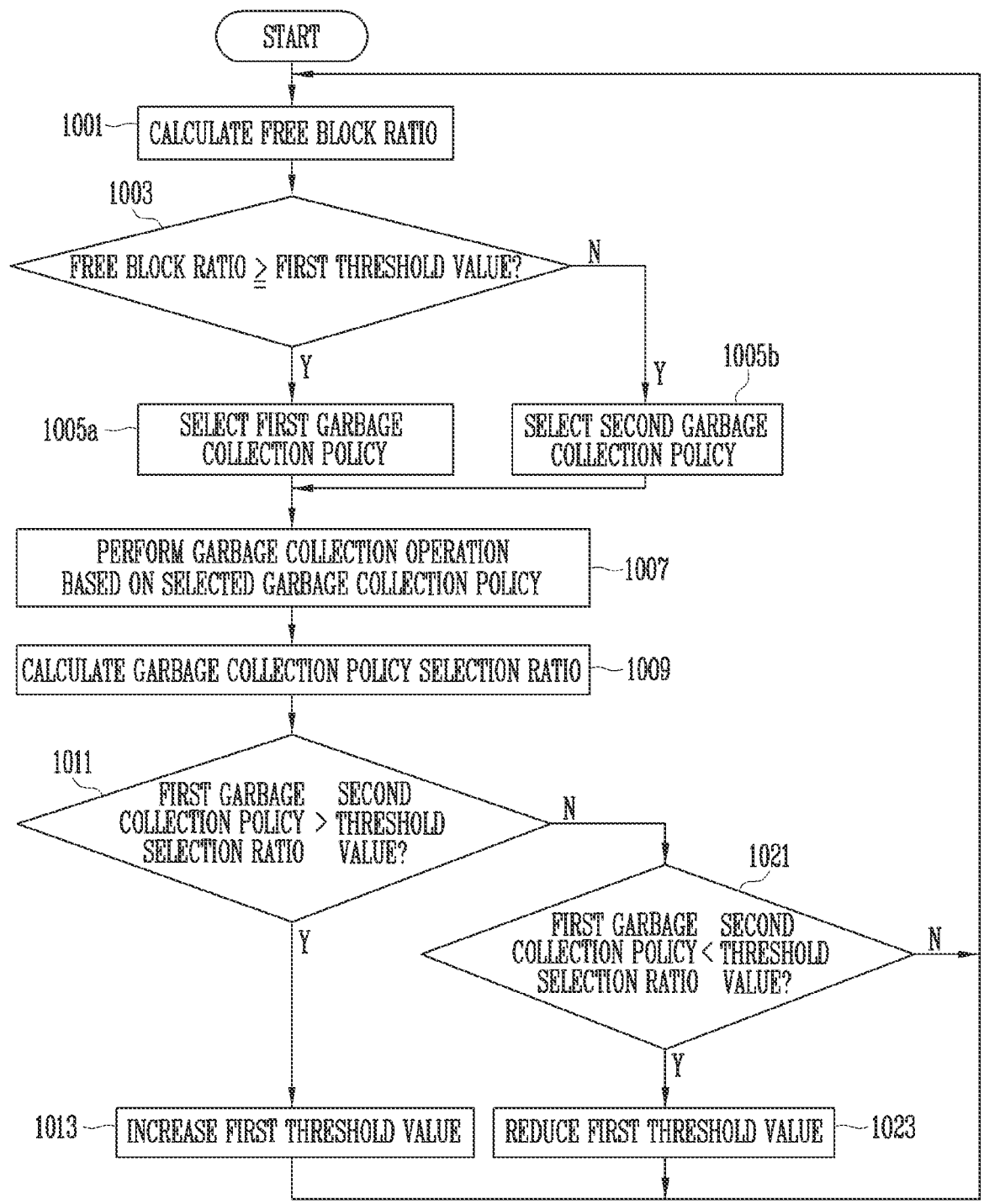
FIG. 10 is a flowchart for describing a method of operating the memory controller in accordance with an embodiment of the present disclosure.

FIG. 10 is a flowchart for describing a method of operating the memory controller in accordance with an embodiment of the present disclosure. The embodiment to be described with reference to FIG. 10 may be applied to steps to be performed after the steps described with reference to FIG. 9, but various embodiments of the present disclosure are not limited thereto. In some embodiment, at least one of the steps shown in FIG. 10 can be omitted, and the sequence of the steps can be changed.

At step 1001, the memory controller may calculate the ratio of free blocks. For example, the memory controller may calculate the ratio of the number of free blocks in the number of total memory blocks included in the memory device.

At step 1003, the memory controller may determine whether the ratio of free blocks is the first threshold value or more. If the ratio of free blocks is the first threshold value or more ("Y" at step 1003), step 1005a proceeds so that the first garbage collection policy may be selected. If the ratio of free blocks is less than the first threshold value (refer to 'N'), step 1005b proceeds so that the second garbage collection policy may be selected. If the first garbage collection policy or the second garbage collection policy is selected, step 1007 may proceed.

At step 1007, the memory controller may perform a garbage collection operation based on the selected garbage collection policy. In an embodiment, if the first garbage collection policy is selected, the memory controller may select, as a victim block, at least one memory block storing a greater number of pieces of cold data. Furthermore, the memory controller may preferentially perform a garbage collection operation on page data including cold data among page data included in the selected victim block. Thereafter, in the case where there is no more page data including cold data among the page data included in the victim block or the number of pieces of page data including cold data is not enough to fill one memory block, the memory controller may perform a garbage collection operation on page data including hot data. In an embodiment, if the second garbage collection policy is selected, the memory controller may preferentially perform a garbage collection operation on a memory block having the least number of valid pages among the memory blocks.

At step 1009, the memory controller may calculate a garbage collection policy selection ratio. For example, the memory controller may manage information about what garbage collection policies were selected for previously-performed garbage collection operations as history information, and determine a ratio between the garbage collection policies selected for the previously-performed garbage collection operations by analyzing the history information. For example, the memory controller may analyze the history information and determine the number of times the first garbage collection policy has been selected per one selection of the second garbage collection policy.

At step 1011, the memory controller may determine whether the ratio at which the first garbage collection policy has been selected per single selection of the second garbage collection policy exceeds the second threshold value. If the ratio at which the first garbage collection policy has been selected per single selection of the second garbage collection policy exceeds the second threshold value ("Y" of step 1011), step 1013 may proceed, or if not ("N" at step 1011), step 1021 may proceed.

At step 1013, the memory controller may increase the first threshold value. For example, the memory controller may increase the first threshold value by a set value. Subsequently, step 1001 for a subsequent garbage collection operation may proceed.

At step 1021, the memory controller may determine whether the ratio at which the first garbage collection policy has been selected per single selection of the second garbage collection policy is less than the second threshold value. If the ratio at which the first garbage collection policy has been selected per single selection of the second garbage collection policy is less than the second threshold value ("Y" of step 1021), step 1023 may proceed, or if not ("N" at step 1021), step 1001 for a subsequent garbage collection operation may proceed without modifying the first threshold value.

At step 1023, the memory controller may reduce the first threshold value. For example, the memory controller may reduce the first threshold value by a set value. Subsequently, step 1001 for the subsequent garbage collection operation may proceed.

Figure 11:
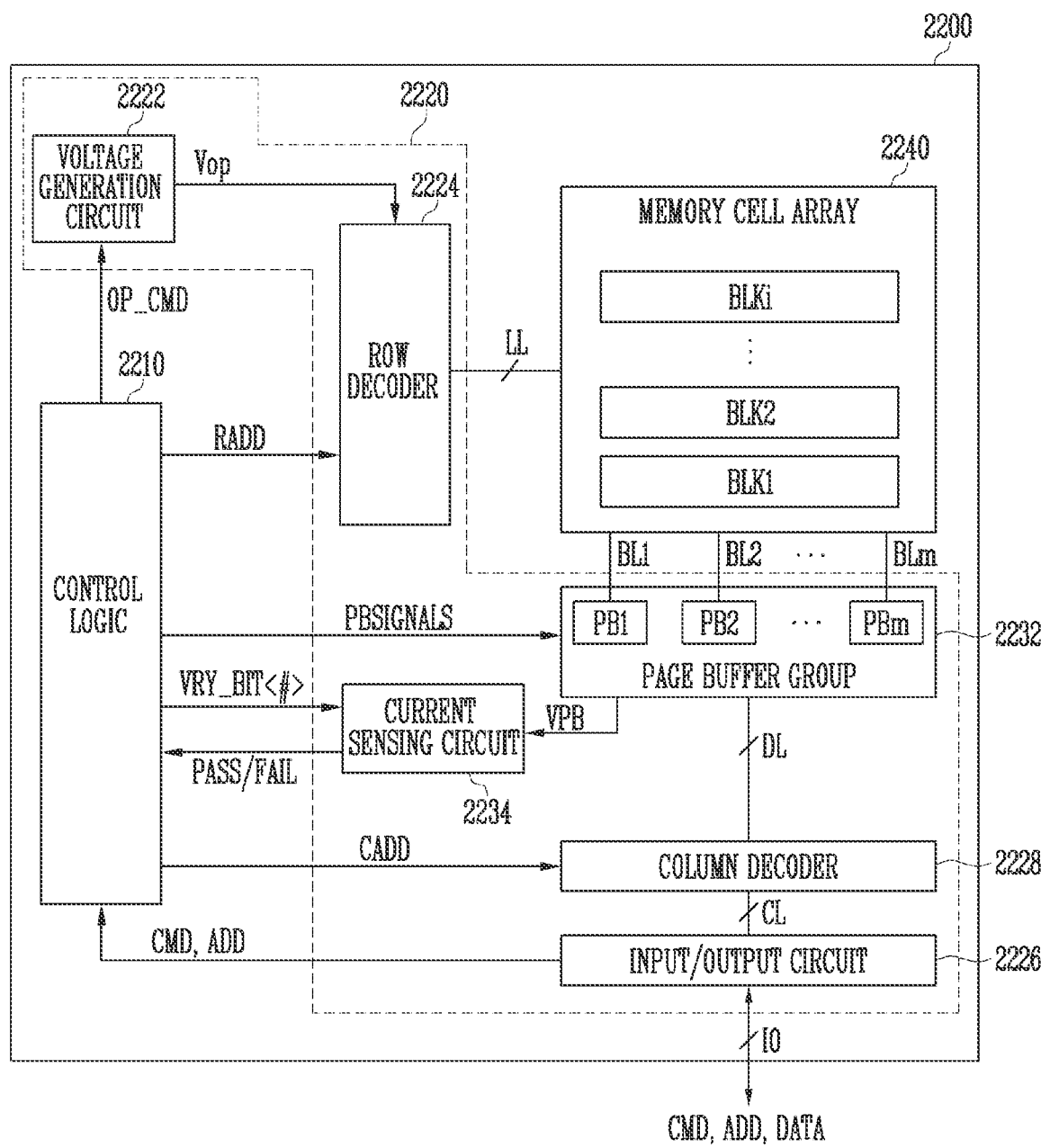
FIG. 11 is a diagram for describing a memory device in accordance with an embodiment of the present disclosure.

FIG. 11 is a diagram for describing a memory device 2200 in accordance with an embodiment of the present disclosure. The memory device 2200 shown in FIG. 11 may be applied to the memory system shown in FIGS. 1 and 2.

The memory device 2200 may include a control logic 2210, peripheral circuits 2220, and a memory cell array 2240. The peripheral circuits 2220 may include a voltage generation circuit 2222, a row decoder 2224, an input/output circuit 2226, a column decoder 2228, a page buffer group 2232, and a current sensing circuit 2234.

The control logic 2210 may control the peripheral circuits 2220 under control of the memory controller 2100 shown in FIGS. 1 and 2.

The control logic 2210 may control the peripheral circuits 2220 in response to a command CMD and an address ADD which are received from the memory controller 2100 through the input/output circuit 2226. For example, the control logic 2210 may output an operating signal OP_CMD, a row address RADD, a column address CADD, page buffer control signals PBSIGNALS, and an enable bit VRY_BIT<#> in response to the command CMD and the address ADD. The control logic 2210 may determine whether a verify operation has passed or failed, in response to a pass signal PASS or a fail signal FAIL received from the current sensing circuit 2234.

The peripheral circuits 2220 may perform a program operation for storing data in the memory cell array 2240, a read operation for outputting the data stored in the memory cell array 2240, or an erase operation for erasing the data stored in the memory cell array 2240.

The voltage generation circuit 2222 may generate various operating voltages Vop to be used for the program operation, the read operation, or the erase operation in response to an operating signal OP_CMD received from the control logic 2210. For example, the voltage generation circuit 2222 may transmit a program voltage, a verify voltage, a pass voltage, a read voltage, an erase voltage, a turn-on voltage, etc. to the row decoder 2224.

The row decoder 2224 may transmit, in response to a row address RADD received from the control logic 2210, operating voltages Vop to local lines LL coupled to a selected one of the memory blocks included in the memory cell array 2240. The local lines LL may include local word lines, local drain select lines, and local source select lines. In addition, the local lines LL may include various lines such as source lines coupled to the memory blocks.

The input/output circuit 2226 may transmit, to the control logic 2210, a command CMD and an address ADD received from the memory controller through input/output lines IO, or may exchange data DATA with the column decoder 2228.

The column decoder 2228 may transmit data between the input/output circuit 2226 and the page buffer group 2232 in response to a column address CADD received from the control logic 2210. For example, the column decoder 2228 may exchange data with page buffers PB1 to PBm through data lines DL or exchange data with the input/output circuit 2226 through column lines CL.

The page buffer group 2232 may be coupled to the bit lines BL1 to BLm coupled in common to the memory blocks BLK1 to BLKi. The page buffer group 2232 may include the plurality of page buffers PB1 to PBm coupled to the bit lines BL1 to BLm. For example, a single page buffer may be coupled to each bit line. The page buffers PB1 to PBm may operate in response to page buffer control signals PBSIGNALS received from the control logic 2210. For example, during a program operation, the page buffers PB1 to PBm may temporarily store program data received from the memory controller, and adjust voltages to be applied to the bit lines BL1 to BLm according to the program data. Furthermore, during a read operation, the page buffers PB1 to PBm may temporarily store data received through the bit lines BL1 to BLm or sense voltages or current of the bit lines BL1 to BLm.

During a read operation or a verify operation, the current sensing circuit 2234 may generate a reference current in response to an enable bit VRY_BIT<#> received from the control logic 2210, and may compare a sensing voltage VPB received from the page buffer group 2232 with a reference voltage generated by the reference current and output a pass signal PASS or a fail signal FAIL.

The memory cell array 2240 may include a plurality of memory blocks BLK1 to BLKi configured to store data. User data and various information needed for operations of the memory device 2200 may be stored in the memory blocks BLK1 to BLKi. The memory blocks BLK1 to BLKi may be embodied in a two-dimensional structure or a three-dimensional structure, and have the same configuration.

Figure 12:
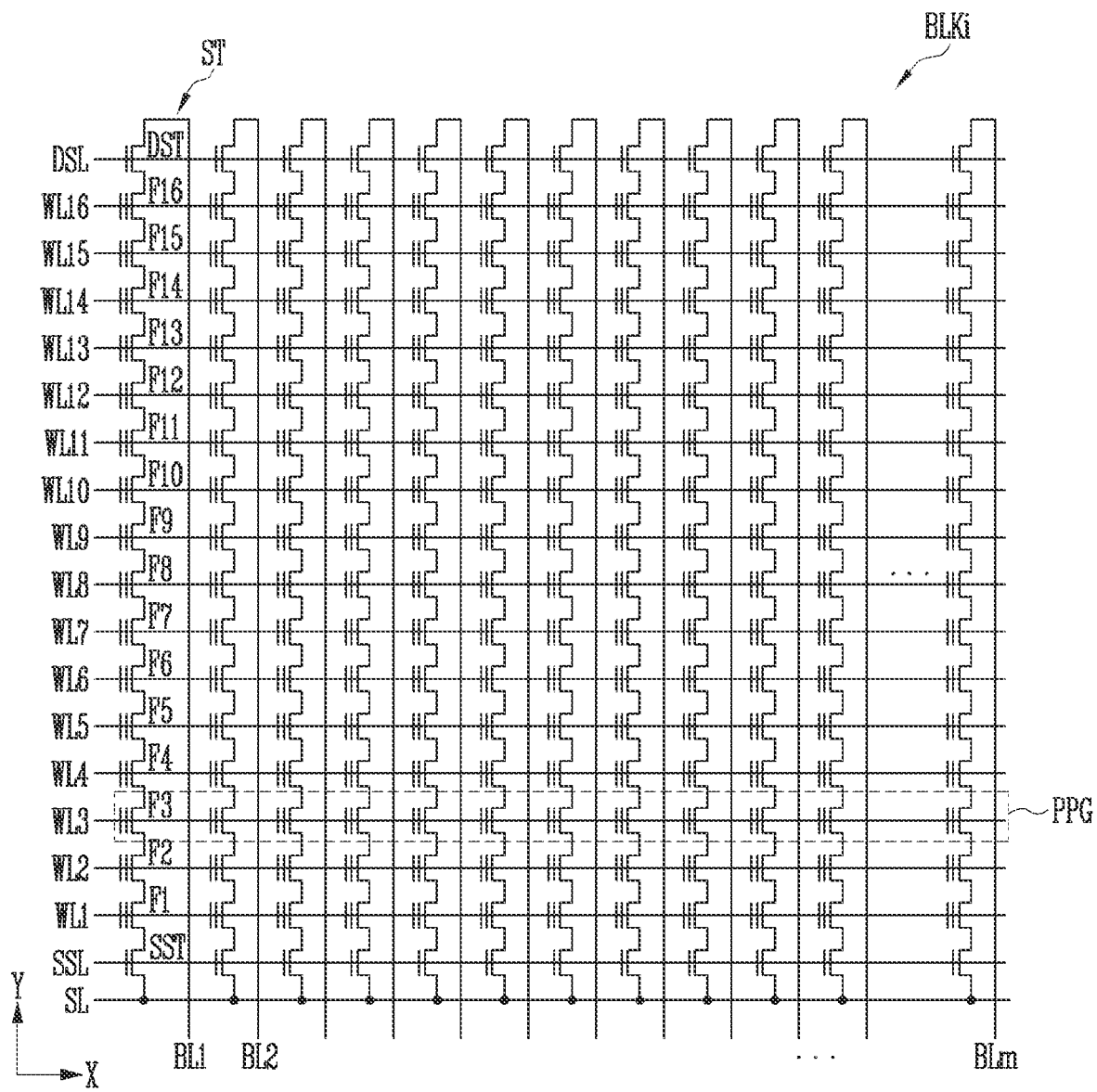
FIG. 12 is a diagram illustrating a memory block in accordance with an embodiment of the present disclosure.

FIG. 12 is a diagram illustrating a memory block BLKi in accordance with an embodiment of the present disclosure.

The memory cell array may include a plurality of memory blocks. In FIG. 12, there is illustrated any one memory block BLKi of the plurality of memory blocks.

In the memory block BLKi, a plurality of word lines arranged parallel to each other may be coupled between a first select line and a second select line. Here, the first select line may be a source select line SSL, and the second select line may be a drain select line DSL. In more detail, the memory block BLKi may include a plurality of strings ST coupled between the bit lines BL1 to BLm and the source line SL. The bit lines BL1 to BLm may be respectively coupled to the strings ST, and the source lines SL may be coupled in common to the strings ST. The strings ST may have the same configuration; therefore, the string ST that is coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to the plurality of word lines WL1 to WL16. Among the memory cells included in different strings ST, a group of memory cells coupled to each word line may be referred to as a physical page PPG. Therefore, the number of physical pages PPG included in the memory block BLKi may correspond to the number of word lines WL1 to WL16.

Each memory cell may store 1-bit data. This memory cell is called a single level cell SLC. In this case, each physical page PPG may store data of a singe logical page LPG. Data of each logical page LPG may include data bits corresponding to the number of cells included in a single physical page PPG. For example, in the case where 2 or more bit data can be stored in each memory cell, each physical page PPG may store data of two or more logical pages LPG. For instance, in an MLC type memory device, data of two logical pages may be stored in each physical page PPG. In a TLC type memory device, data of three logical pages may be stored in each physical page PPG.

Figure 13:
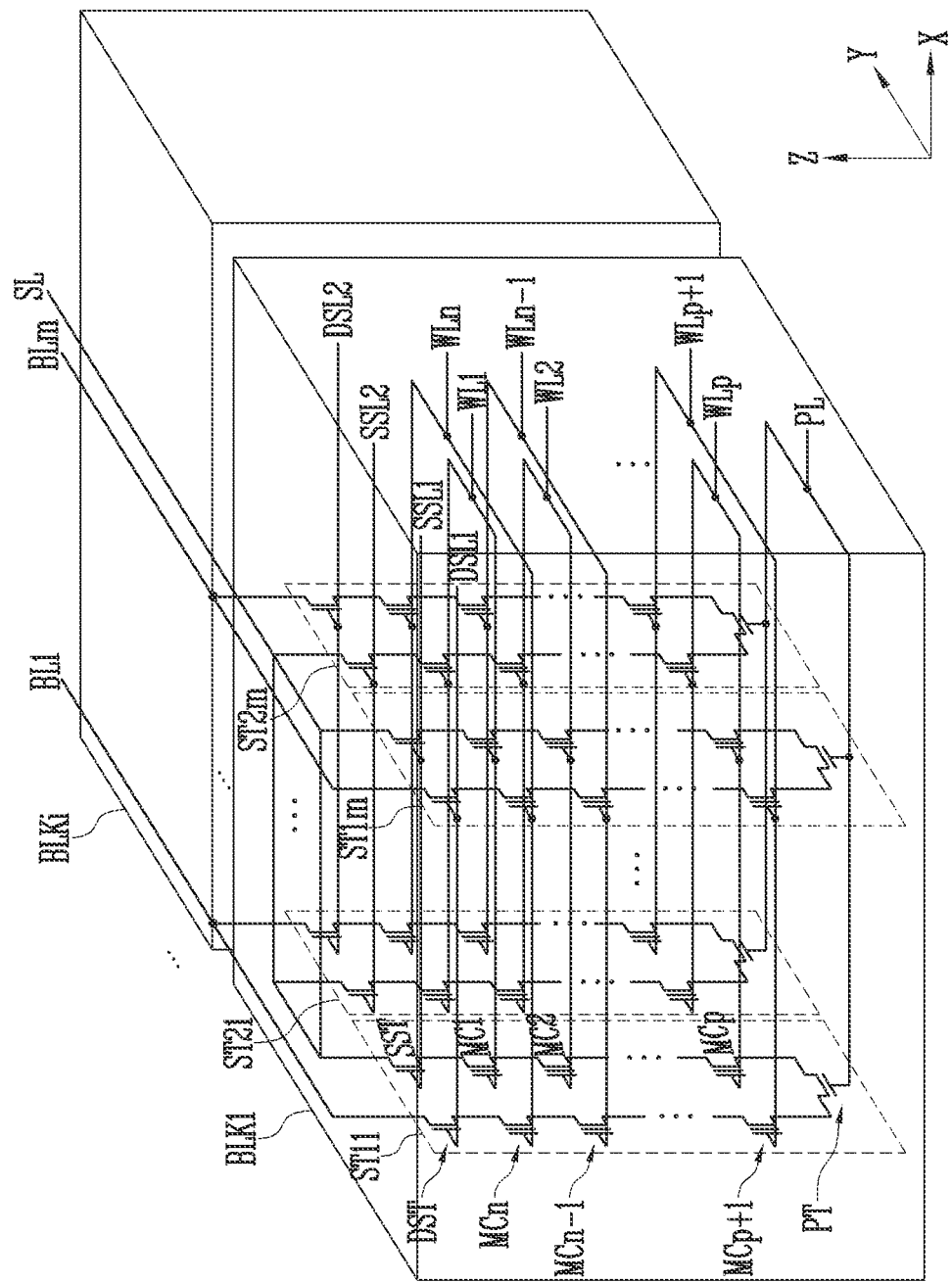
FIG. 13 is a diagram illustrating a memory block having a three-dimensional structure in accordance with an embodiment of the present disclosure.

FIG. 13 is a diagram illustrating a memory block having a three-dimensional structure in accordance with an embodiment of the present disclosure.

The memory cell array 2240 may include a plurality of memory blocks BLK1 to BLKi. The first memory block BLK1 will be described by way of example. The first memory block BLK1 may include a plurality of strings ST11 to ST1*m* and ST21 to ST2*m*. In an embodiment, each of the strings ST11 to ST1*m* and ST21 to ST2*m* may be formed in a 'U' shape. In the first memory block BLK1, m strings may be arranged in a row direction (i.e. an X direction). In FIG. 13, there has been illustrated the case where two strings are arranged in a column direction (i.e., a Y direction), this is only for the sake of explanation. For example, three or more strings may be arranged in the column direction (the Y direction).

Each of the strings ST11 to ST1*m* and ST21 to ST2*m* may include at least one source select transistor SST, first to n-th memory cells MC1 to MCn, a pipe transistor PT, and at least one drain select transistor DST.

The source select transistor SST, the drain select transistor DST and the memory cells MC1 to MCn may have structures similar to each other. For example, each of the source select transistor SST, the drain select transistor DST and the memory cells MC1 to MCn may include a channel layer, a tunnel insulating layer, a charge trap layer, and a blocking insulating layer. For example, a pillar for providing the channel layer may be provided in each string. For instance, a pillar for providing at least one of the channel layer, the tunnel insulating layer, the charge trap layer, and the blocking insulating layer may be provided in each string.

The source select transistor SST of each string may be coupled between the source line SL and the memory cells MC1 to MCp.

In an embodiment, source select transistors of strings arranged in the same row may be coupled to a source select line extending in the row direction. Source select transistors of strings arranged in different rows may be coupled to different source select lines. In FIG. 13, source select transistors of the strings ST11 to ST1*m* in a first row may be coupled to a first source select line SSL1. Source select transistors of the strings ST21 to ST2*m* in a second row may be coupled to a second source select line SSL2.

In an embodiment, the source select transistors of the strings ST11 to ST1*m* and ST21 to ST2*m* may be coupled in common to a single source select line.

The first to n-th memory cells MC1 to MCn in each string may be coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp may be successively arranged in a vertical direction (i.e., in a Z direction) and coupled in series to each other between the source select transistor SST and the pipe transistor PT. The p+1-th to n-th memory cells MCp+1 to MCn may be successively arranged in the vertical direction (the Z direction) and coupled in series to each other between the pipe transistor PT and the drain select transistor DST. The first to p-th memory cells MC1 to MCp and the p+1-th to n-th memory cells MCp+1 to MCn may be coupled to each other through the pipe transistor PT. Gates of the first to n-th memory cells MC1 to MCn of each string may be respectively coupled to first to n-th word lines WL1 to WLn.

In an embodiment, at least one of the first to n-th memory cells MC1 to MCn may be used as a dummy memory cell.

In the case where the dummy memory cell is provided, the voltage or the current of the corresponding string may be stably controlled. A gate of the pipe transistor PT of each string may be coupled to a pipeline PL.

The drain select transistor DST of each string may be coupled between the corresponding bit line and the memory cells MCp+1 to MCn. Strings arranged in the row direction may be coupled to corresponding drain select lines extending in the row direction. The drain select transistors of the strings ST11 to ST1m in the first row may be coupled to a first drain select line DSL1. The drain select transistors of the strings ST21 to ST2m in the second row may be coupled to a second drain select line DSL2.

Strings arranged in the column direction may be coupled to corresponding bit lines extending in the column direction. In FIG. 13, the strings ST11 and ST21 in a first column may be coupled to a first bit line BL1. The strings ST1m and ST2m in an m-th column may be coupled to an m-th bit line BLm.

Among the strings arranged in the row direction, memory cells coupled to the same word line may form one page. For example, memory cells coupled to the first word line WL1 in the strings ST11 to ST1m of the first row may form a single page. Memory cells coupled to the first word line WL1 in the strings ST21 to ST2m of the second row may form another single page. When any one of the drain select lines DSL1 and DSL2 is selected, strings arranged in the corresponding row may be selected. When any one of the word lines WL1 to WLn is selected, a corresponding single page may be selected from the selected strings.

Figure 14:
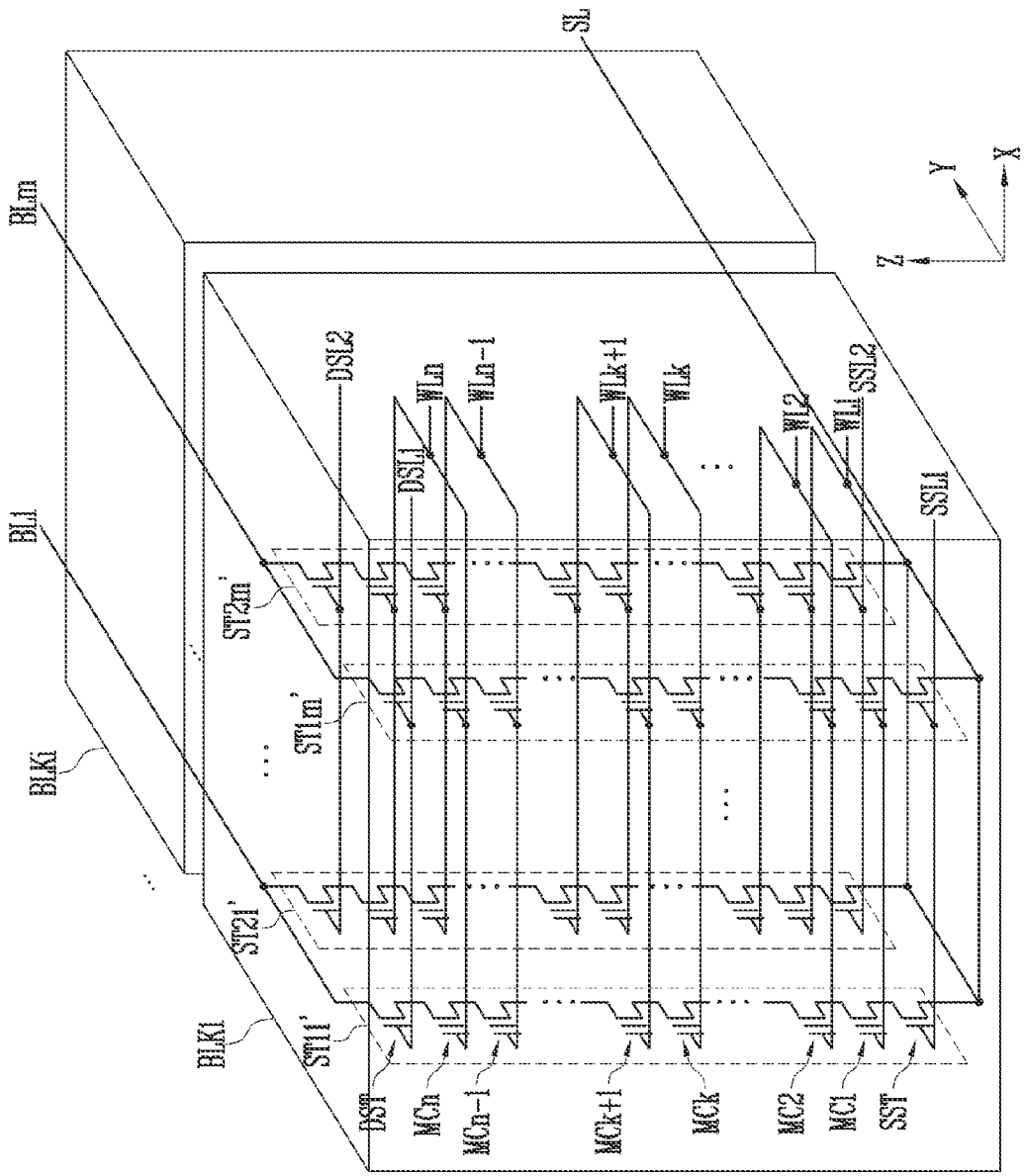
FIG. 14 is a diagram illustrating a memory block having a three-dimensional structure in accordance with an embodiment of the present disclosure.

FIG. 14 is a diagram illustrating a memory block having a three-dimensional structure in accordance with an embodiment of the present disclosure.

The memory cell array 2240 may include a plurality of memory blocks BLK1 to BLKi. The first memory block BLK1 will be described by way of example. The first memory block BLK1 may include a plurality of strings ST11' to ST1m' and ST21' to ST2m'. Each of the strings ST11' to ST1m' and ST21' to ST2m' may extend in a vertical direction (i.e., in a Z direction). In each memory block BLKi, m' strings may be arranged in a row direction (i.e., in an X direction). In FIG. 14, there has been illustrated the case where two strings are arranged in a column direction (i.e., in a Y direction), this is only for the sake of explanation. For example, three or more strings may be arranged in the column direction (the Y direction).

Each of the strings ST11' to ST1m' and ST21' to ST2m' may include at least one source select transistor SST, first to n-th memory cells MC1 to MCn, and at least one drain select transistor DST.

The source select transistor SST of each string may be coupled between the source line SL and the memory cells MC1 to MCn. Source select transistors of strings arranged in the same row may be coupled to the same source select line. The source select transistors of the strings ST11' to ST1m' arranged in a first row may be coupled to a first source select line SSL1. The source select transistors of the strings ST21' to ST2m' arranged in a second row may be coupled to a second source select line SSL2. In an embodiment, the source select transistors of the strings ST11' to ST1m' and ST21' to ST2m' may be coupled in common to a single source select line.

The first to n-th memory cells MC1 to MCn in each string may be coupled in series between the source select transistor SST and the drain select transistor DST. Gates of the first to n-th memory cells MC1 to MCn may be respectively coupled to first to n-th word lines WL1 to WLn.

In an embodiment, at least one of the first to n-th memory cells MC1 to MCn may be used as a dummy memory cell. In the case where the dummy memory cell is provided, the voltage or the current of the corresponding string may be stably controlled. Thereby, the reliability of data stored in the first memory block BLK1 may be improved.

The drain select transistor DST of each string may be coupled between the corresponding bit line and the memory cells MC1 to MCn. Drain select transistors DST of strings arranged in the row direction may be coupled to corresponding drain select lines extending in the row direction. The drain select transistors DST of the strings ST11' to ST1m' in the first row may be coupled to a first drain select line DSL1. The drain select transistors DST of the strings ST21' to ST2m' in the second row may be coupled to a second drain select line DSL2.

In other words, the first memory block BLK1 of FIG. 14 may have an equivalent circuit similar to that of the first memory block BLK1 of FIG. 13 except that a pipe transistor PT is excluded from each cell string.

Figure 15:
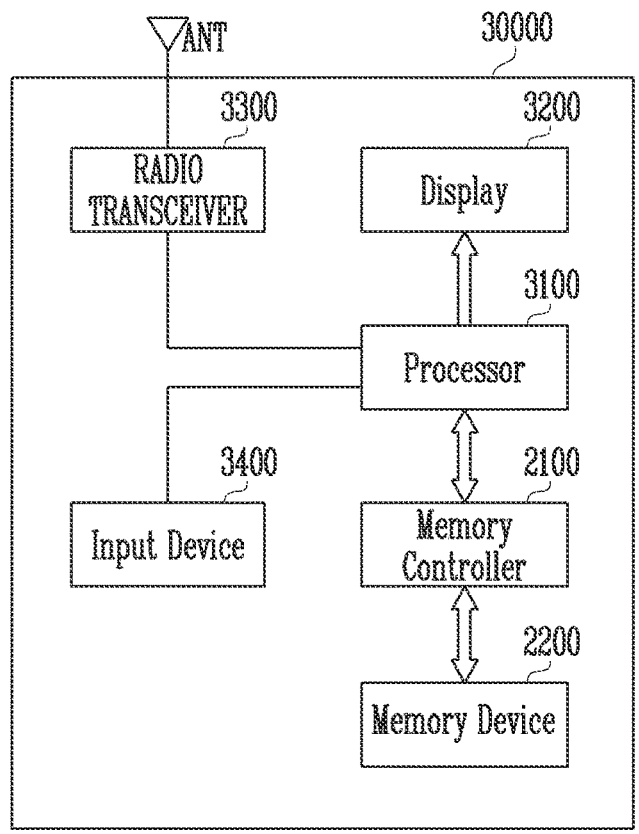
FIGS. 15 to 18 are diagrams illustrating various examples of a memory system including the memory controller shown in FIGS. 1 and 2.

FIG. 15 is a diagram illustrating an example of a memory system 30000 including the memory controller shown in FIGS. 1 and 2.

Referring to FIG. 15, the memory system 30000 may be embodied in a cellular phone, a smartphone, a tablet personal computer (PC), a personal digital assistant (PDA) or a wireless communication device. The memory system 30000 may include a memory device 2200 and a memory controller 2100 configured to control the operation of the memory device 2200.

The memory controller 2100 may control a data access operation, e.g., a program operation, an erase operation, or a read operation, of the memory device 2200 under control of a processor 3100.

Data programmed in the memory device 2200 may be outputted through a display 3200 under control of the memory controller 2100.

A radio transceiver 3300 may send and receive radio signals through an antenna ANT. For example, the radio transceiver 3300 may change a radio signal received through the antenna ANT into a signal capable of being processed in the processor 3100. Therefore, the processor 3100 may process a signal outputted from the radio transceiver 3300 and transmit the processed signal to the memory controller 2100 or the display 3200. The memory controller 2100 may transmit a signal processed by the processor 3100 to the memory device 2200. Furthermore, the radio transceiver 3300 may change a signal outputted from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data outputted from the memory controller 2100, data outputted from the radio transceiver 3300, or data outputted form the input device 3400 is outputted through the display 3200.

In an embodiment, the memory controller 2100 capable of controlling the operation of the memory device 2200 may be embodied as a part of the processor 3100 or a chip provided separately from the processor 3100.

Figure 16:
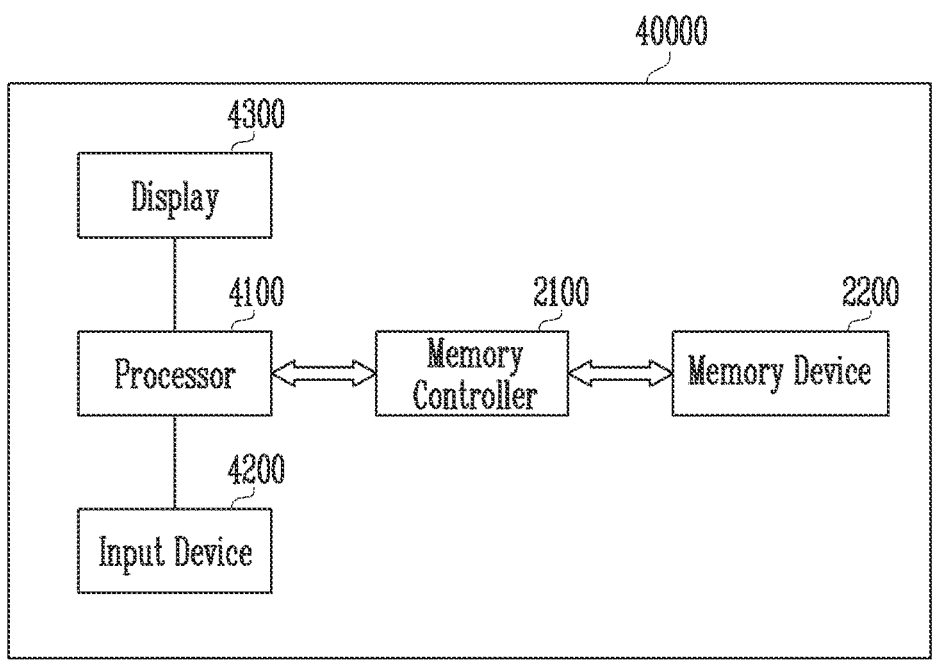

FIG. 16 is a diagram illustrating an example of a memory system 40000 including the memory controller shown in FIGS. 1 and 2.

Referring to FIG. 16, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a memory device 2200, and a memory controller 2100 configured to control a data processing operation of the memory device 2200.

A processor 4100 may output data stored in the memory device 2200 through a display 4300, according to data input from an input device 4200. For example, the input device 4200 may be embodied in a pointing device such as a touch pad or a computer mouse, a keypad, or a keyboard.

The processor 4100 may control the overall operation of the memory system 40000 and control the operation of the memory controller 2100. In an embodiment, the memory controller 2100 capable of controlling the operation of the memory device 2200 may be embodied as a part of the processor 4100 or a chip provided separately from the processor 4100.

Figure 17:
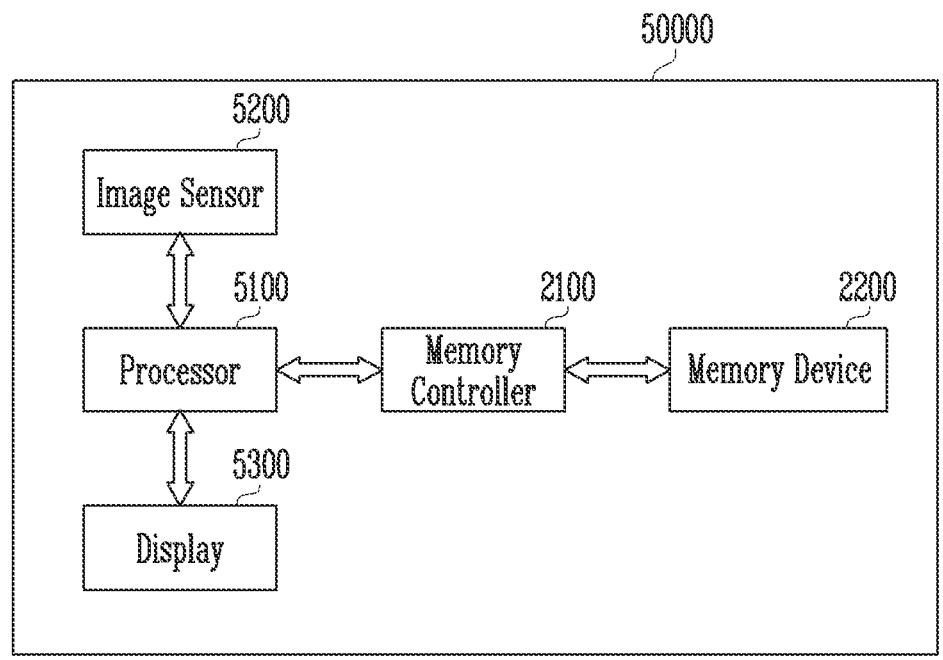

FIG. 17 is a diagram illustrating an example of a memory system 50000 including the memory controller shown in FIGS. 1 and 2.

Referring to FIG. 17, the memory system 50000 may be embodied in an image processing device, e.g., a digital camera, a portable phone provided with a digital camera, a smartphone provided with a digital camera, or a tablet PC provided with a digital camera.

The memory system 50000 may include a memory device 2200, and a memory controller 2100 configured to control a data processing operation, e.g., a program operation, an erase operation, or a read operation, of the memory device 2200.

An image sensor 5200 of the memory system 50000 may convert an optical image into digital signals. The converted digital signals may be transmitted to a processor 5100 or the memory controller 2100. Under control of the processor 5100, the converted digital signals may be outputted through a display 5300 or stored in the memory device 2200 through the memory controller 2100. Data stored in the memory device 2200 may be outputted through the display 5300 under control of the processor 5100 or the memory controller 2100.

In an embodiment, the memory controller 2100 capable of controlling the operation of the memory device 2200 may be embodied as a part of the processor 5100 or a chip provided separately from the processor 5100.

Figure 18:
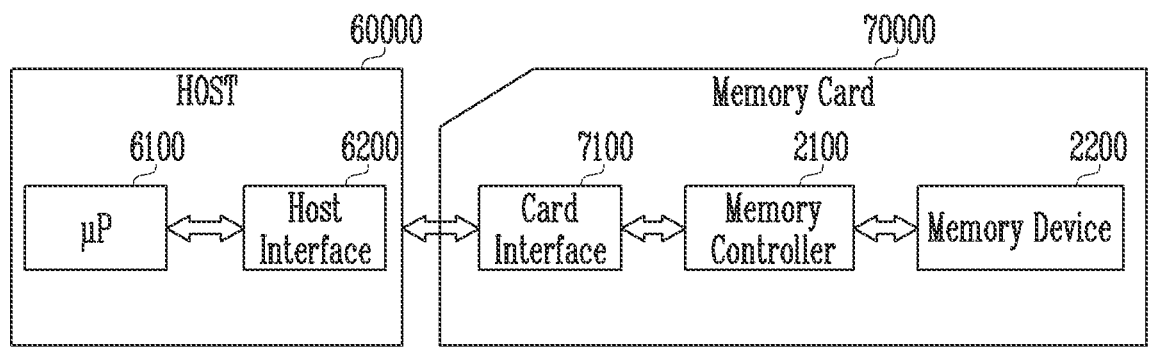

FIG. 18 is a diagram illustrating an example of a memory system 70000 including the memory controller shown in FIGS. 1 and 2.

Referring to FIG. 18, the memory system 70000 may be embodied in a memory card or a smart card. The memory system 70000 may include a memory device 2200, a memory controller 2100, and a card interface 7100.

The controller 2100 may control data exchange between the memory device 2200 and the card interface 7100. In an embodiment, the card interface 7100 may be a secure digital (SD) card interface or a multimedia card (MMC) interface, but it is not limited thereto.

The card interface 7100 may interface data exchange between a host 60000 and the memory controller 2100 according to a protocol of the host 60000. In an embodiment, the card interface 7100 may support a universal serial bus (USB) protocol, and an interchip (IC)-USB protocol. Here, the card interface 7100 may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 2200 through the card interface 7100 and the memory controller 2100 under control of a microprocessor (μP) 6100.

In accordance with the present disclosure, an efficient garbage collection operation corresponding to data attributes may be performed.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
   a memory device including a plurality of memory blocks; and
   a memory controller configured to receive data and attribute information of the data indicating whether the data is hot data or cold data from a host, control the memory device to store the data and the attribute information in one of the plurality of memory blocks, and determine a) a number of free blocks among the plurality of memory blocks, b) a number of cold pages including the attribute information of the cold data, and c) a number of valid pages,
   wherein the memory controller, during a garbage collection, is configured to:
   when the number of free blocks among the plurality of memory blocks is greater than a first threshold number, select a first memory block among the plurality of memory blocks as a victim block based on the number of cold pages including the attribute information of the cold data; and
   when the number of free blocks is less than the first threshold number, select a second memory block among the plurality of memory blocks as the victim block based on the number of valid pages,
   wherein the first memory block includes the number of cold pages greater than a second threshold number, and
   wherein the second memory block includes the number of valid pages less than a third threshold number.

2. The memory system according to claim 1, wherein the memory controller is configured to select the first memory block including more cold pages including the attribute information of the cold data than hot pages including the attribute information of the hot data as the victim block.

3. The memory system according to claim 1, wherein the memory controller, when the first memory block is selected as the victim block, is configured to perform the garbage collection on cold pages included in the first memory block prior to the garbage collection on hot pages included in the first memory block.

4. The memory system according to claim 1, wherein the memory controller is configured to select the second memory block including more invalid pages than valid pages as the victim block.

5. The memory system according to claim 1, wherein the one of the plurality of memory blocks includes a plurality of pages each including a normal area and a spare area, and
wherein the memory controller is configured to control the memory device to store the data in the normal area and store the attribute information in the spare area in response to a program request received from the host.

6. The memory system according to claim 1, wherein the memory controller is configured to adjust the first threshold number based on a selection number of times between the first memory block and the second memory block.

7. The memory system according to claim 6, the memory controller is configured to increase the first threshold number when the selection number is greater than a predetermined number.

8. The memory system according to claim 6, the memory controller is configured to decrease the first threshold number when the selection number is less than a predetermined number.

9. The memory system according to claim 1, wherein the memory controller is configured to select the second memory block including more invalid pages than valid pages as the victim block.

10. A memory system comprising:
a memory device including a plurality of memory blocks configured to store data and attribute information of the data indicating whether the data is hot data or cold data and determine a) a number of free blocks among the plurality of memory blocks, b) a number of cold pages including the attribute information of the cold data, and c) a number of valid pages, the data and the attribute information being received from a host; and
a memory controller, during a garbage collection, configured to:
when the number of free blocks among the plurality of memory blocks is greater than a first threshold number, select a first memory block among the plurality of memory blocks as a victim block based on the number of cold pages including the attribute information of the cold data; and
when the number of free blocks is less than the first threshold number, select a second memory block among the plurality of memory blocks as the victim block based on the number of valid pages,
wherein the first memory block includes the number of cold pages greater than a second threshold number, and
wherein the second memory block includes the number of valid pages less than a third threshold number.

11. The memory system according to claim 10, wherein the first memory block includes the number of cold pages greater than a second threshold number.

12. The memory system according to claim 10, wherein the second memory block includes the number of valid pages less than a third threshold number.

13. The memory system according to claim 10, wherein the memory controller is configured to select the first memory block including more cold pages including the attribute information of the cold data than hot pages including the attribute information of the hot data as the victim block.

14. The memory system according to claim 10, wherein the memory controller, when the first memory block is selected as the victim block, is configured to perform the garbage collection on cold pages included in the first memory block prior to the garbage collection on hot pages included in the first memory block.

15. The memory system according to claim 10, wherein one of the plurality of memory blocks includes a plurality of pages each including a normal area and a spare area, and
wherein the memory controller is configured to control the memory device to store the data in the normal area and store the attribute information in the spare area in response to a program request received from the host.

16. The memory system according to claim 10, wherein the memory controller is configured to adjust the first threshold number based on a selection number of times between the first memory block and the second memory block.

17. The memory system according to claim 16, the memory controller is configured to increase the first threshold number when the selection number is greater than a predetermined number.

18. The memory system according to claim 16, the memory controller is configured to decrease the first threshold number when the selection number is less than a predetermined number.

* * * * *